Patented Nov. 24, 1942

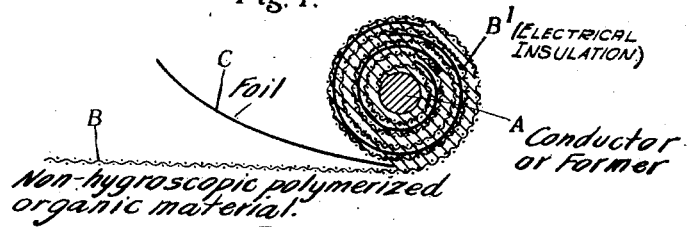
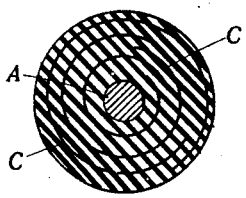
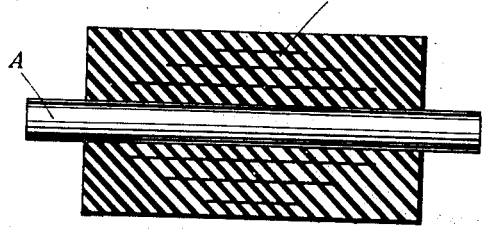
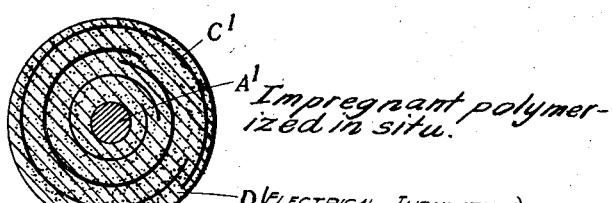
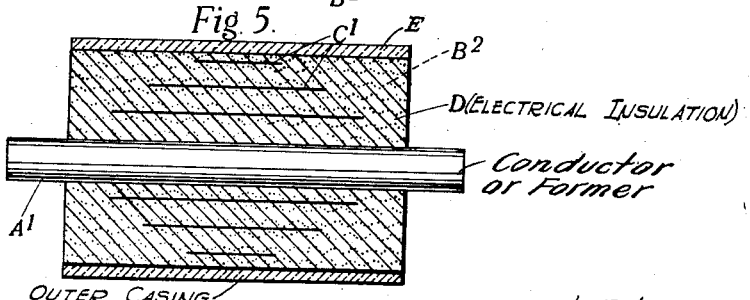

2,303,283

UNITED STATES PATENT OFFICE 2,303,283

ELECTRICALLY INSULATING BODIES

Ian Ward Anderson Kirkwood and Patrick Dunbar Ritchie, Newcastle-on-Tyne, England, assignors to A. Reyrolle & Company Limited, Hebburn-on-Tyne, England, a company of Great Britain Application June 13, 1939, Serial No. 278,966
In Great Britain June 14, 1938

11 Claims. (Cl. 174—143)

This invention relates to electrically insulating bodies. The invention is particularly, though not exclusively, applicable to insulating bodies, such for example as insulating bushings or sleeves, having inserts of electrically conducting material, such for example as condenser foils.

Electrical insulators consisting of superimposed layers of cellulosic material such as paper, cloth or the like bonded with synthetic resins or other binders are liable to absorb moisture since they are inherently hygroscopic. This results in a decrease of dielectric strength, increase of power factor, and swelling of the insulator where the ends are exposed.

An object of the invention is to form an electrically insulating body by wrapping, winding, or otherwise packing a non-hygroscopic polymerised organic material so as to form a preliminary support, and filling the interstices in the support with a polymerisable substance in liquid or semi-liquid form, the whole being subjected to a polymerisation treatment so as to form a solid mass.

The invention may be applied for the manufacture of electrical bushings or sleeves of the kind having stress-grading condenser foils arranged concentrically about the axis of the bushing or sleeve. Though such foils could be readily inserted if the bushing were formed by wrapping strips of paper in superimposed layers, since the foils would merely have to be inserted at the appropriate points between the layers as these are formed, this is not practicable if the foils are to be incorporated in moulded or cast insulating material owing to the difficulty experienced in maintaining the foils accurately in position during the moulding or casting process. According to another object of the invention this difficulty is overcome by arranging the foil or foils between wrapped, wound or otherwise packed layers of the non-hygroscopic polymerised organic material constituting the preliminary support, so that the foils are held in position by the preliminary support and are bound accurately in this position by the polymerisation treatment. The foil or foils may be perforated at intervals in order to facilitate impregnation or filling of the interstices in the preliminary support. Should the polymer employed as the preliminary support be such that it tends to soften during the polymerisation treatment, the preliminary support may be furnished with a reinforcement, such for example as fibrous or woven glass wool, or other non-crystalline glass-like substance, which will act as a stiffener to retain the electrically conductive insert or inserts accurately in position even should the support soften.

A further object of the invention is to form the said preliminary support by packing the polymerised substance in superimposed layers which may be flat, annular or otherwise shaped to suit the shape of the insulating body to be produced, the conducting insert or inserts being arranged between adjacent layers. The said support may be formed from a textile fabric woven from spun fibres or threads of the desired polymer. The support may however be formed of thin films, sheets or membranes of the polymer, or in the form of irregular layers similar to felt. Again, the support may be formed by closely wound convolutions of extruded woven or braided cord.

Any suitable polymerisable substance may be employed as the filler, this substance being such that when polymerised it yields a polymer either the same as or different from the polymerised organic substance constituting the support. Preferably, however, the filling medium is constituted by the monomer of the polymerised organic substance constituting the support. According to another method, the filling medium may be a polymerisable substance which has already undergone a certain degree of polymerisaton, that is to say the original mobile liquid monomer has been subjected to the controlled action of heat or other polymerising agency, but still contains a considerable amount of monomer as diluent, and is thus still sufficiently fluid to allow satisfactory permeation of the interstices in the support prior to the final polymerisation treatment. According to yet a further method the filling substance may be constituted by a solution of a polymer in its parent monomer, the viscosity being suitably adjusted to provide satisfactory permeation of the interstices in the support by the semi-liquid filling substance prior to the final polymerisation treatment.

In the accompanying drawing:

Figure 1 shows one method of manufacture according to the invention,

Figures 2 and 3 show the bushing in end elevation and longitudinal section respectively, and Figures 4 and 5 illustrate a modified construction in end elevation and longitudinal section respectively.

As shown in Figure 1 the bushing is formed by wrapping around a central conductor A, or a suitable former, successive turns of a textile B woven from polystyrene fibres or threads, sheet metal condenser foils C being successively inserted as the layers $B^1$ of the textile are wound. After winding a preliminary support, with inserted condenser foils, in this way the porous cylindrical mass is inserted in a container in which the interstices in and between the layers $B^1$ are filled (preferably in vacuo) with monomeric styrene, the whole being then subjected to polymerisation treatment by heating. This polymerisation may be effected under pressure to avoid the formation of bubbles in the mass, if desired with the addition of any suitable polymerisation catalyst. The resulting bushing will be as shown in Figures 2 and 3, that is to say a substantially homogeneous mass of polystyrene in which are embedded the "floating" condenser foils C. Although prior to polymerisation the structure is in the form of annular superimposed layers $B^1$ and C, the distinction between the polystyrene support $B^1$ and the monomeric filler gradually disappears as the polymerisation treatment decreases. The mass surrounding the foils C will thus be substantially homogeneous though the mean molecular weight of the polymerised filler may not be wholly identical with that of the polystyrene support.

Instead, however, of employing a polymerisable filler whose monomer is the same as that of the porous fibrous support, the polymerisable filler employed may be a monomer or lower polymer which will yield a polymer different from that forming the support, since many polymers are soluble in the parent monomer which might cause practical manufacturing difficulties. If the polymerisable filler employed has a monomer different from that of the polymeric porous support, the stress-grading layers will not be embedded in an entirely homogeneous polymer mass but will be distinguishable in the finished bushing as shown in Figures 4 and 5 in which the original layers of the polymeric support $B^2$ are just distinguishable from the surrounding polymerised filler D which, however, constitutes a solid mass around the core or former $A^1$ and has the condenser foils $C^1$ firmly embedded therein.

The invention is also applicable to long insulated conductors or cables by forming a preliminary support about a current carrying conductor from a polymer in tape, strip or cord form, for example a woven or felted tape, the tape being helically wound about the conductor in one or more layers and the interstices in the layers filled as above described. This method may also be employed with advantage for forming an insulating jacket or casing around articles of other shapes, such for example as current transformers. An insulating body formed by any of the above methods can be subsequently treated by pressure and/or heat to modify its shape as required, for example to convert a circular cross-section to a cross-section other than circular.

Any suitable polymerised organic material may be employed to form the support. Preferably, however, the preliminary support is formed of a textile woven from a polymer whose corresponding liquid monomer is available to fill the interstices of the support prior to the polymerisation treatment. For example, the preliminary support may be formed of such materials as polyvinyl acetate and polymethyl methacrylate which, in addition to polystyrene above described, are available in monomeric form. As a further example, plastic materials such as polyvinyl acetal may be employed, the latter being said to be a polyvinyl acetate some of whose acetyl groups have been removed by hydrolysis and replaced by acetal groupings by the action of formaldehyde. The fibres of the polymer have a very advantageously high resistance to distortion as compared with the majority of thermoplastic polymers, but no true monomer is available so that another monomer, such for example as styrene, will be used as the filler.

If desired various combinations of materials may be employed in the formation of the support. For example, the preliminary support may be formed from a woven co-polymer such as that obtained by co-polymerising vinyl chloride and vinyl acetate, or styrene and vinyl acetate, the filler being a monomer or lower polymer which will yield a polymer either chemically different from or the same as that forming the support. It is desirable to employ as the filler a monomer which is a non-solvent of the polymer of the preliminary support in order to avoid undesirable swelling effects. Shrinkage due to contraction of the filler on polymerisation thereof may, for example in any of the methods above described, be minimised by using as the filler a solution of a polymer in its parent monomer or partially polymerised monomer, adjusted to the desired viscosity. In this respect it will also be advantageous to use as the support a weave of polymeric fibres which have an appreciable elasticity, the fabric being wound under tension so that the fibres of the support will tend to "take up" the contraction due to the shrinkage of the filler during polymerisation. It may also be advantageous to provide a fabric whose warp and weft threads have different properties, as for example by the elasticity of the warp threads differing from that of the weft threads.

When the polymer employed for forming the preliminary support is such that it is liable to be softened by the filler, it may prove difficult to retain the conducting insert or inserts, e. g. condenser foils, accurately in position. With a view to overcoming this difficulty, there may be incorporated in the preliminary support a reinforcement which will not be softened by the filler and will thus act as a stiffener to retain the conducting insert or inserts accurately in position until the filler has solidified. For example, in any one of the methods above described, fibrous material such as glass wool, say in the form of a grid or net, may be included in the preliminary support. This reinforcement does not substantially affect the electrical properties of the insulating body, since it constitutes only a small proportion of the total mass.

With a view to distributing the electrical stress throughout the insulating body more evenly, the body may be built up from a number of polymers having different electric characteristics. For example, in an electrical bushing or insulated conductor formed by any one of the methods described, the insulation nearest to the central conductor may have a greater permittivity than the insulation more remote therefrom.

It is also possible to form the electrically insulating bushing or sleeve by first forming a porous preliminary support formed of at least two polymers whose electric characteristics differ from each other and filling the interstices in the support with the polymerizable substance in a fluid state, and finally subjecting the combination to heat which polymerizes the filler and forms the whole into a solid mass. Of course, the stress grading conducting foil is incorporated between the layers of porous preliminary support prior to the introduction of the filling fluid.

Since most of the polymers suitable for forming the preliminary support will tend to soften when heated above a given temperature and will therefore impose a limit on the effective working temperature of the insulating body produced according to the invention, it may be necessary to enclose or support the insulating body in a relatively rigid tubular casing E as shown in Figure 5 and formed for example of porcelain or paper bound with a phenolic resin. This will effectively extend the permissible range of working temperature.

It will be seen that apart from affording advantages in manufacture and providing an insulating body which not only has satisfactory electrical properties but is also non-hygroscopic or substantially non-hygroscopic, the invention provides a simple method of accurately maintaining the conductor or inserts in position within the insulating material.

What we claim as our invention and desire to secure by Letters Patent is:

1. The method of forming an electrically insulating bushing or sleeve, which comprises forming a porous preliminary support of a fibrous non-hygroscopic polymerised organic material, incorporating at least one stress-grading layer in said support, filling the interstices in the support with a polymerisable substance in fluid form, and subjecting the whole to polymerisation treatment which agglomerates it into a solid mass.

2. The method of forming an electrical condenser bushing or sleeve which comprises forming a porous preliminary support about a central conductor by winding or wrapping a fibrous non-hygroscopic polymerised organic material in a number of superimposed layers about the central conductor, arranging at least one stress-grading conducting foil between adjacent layers, filling the interstices in the preliminary support with a polymerisable substance in fluid form, and subjecting the whole to polymerisation treatment which solidifies the whole mass with the conducting foils embedded therein.

3. The method of forming an electrical condenser bushing or sleeve, which comprises forming a porous preliminary support about a central conductor by winding or wrapping woven polystyrene fibres in a number of superimposed layers about the central conductor, arranging stress-grading conducting foils between adjacent layers as they are wound, impregnating the interstices in the layers in vacuo with monomeric styrene, and subjecting the whole to polymerisation treatment so as to form a solid mass with the conducting foils embedded therein.

4. The method of forming an electrical insulating bushing or sleeve, which comprises forming a porous preliminary support of a fibrous, non-hygroscopic, polymerised organic material, incorporating at least one stress-grading layer in the support during the formation thereof, filling the interstices in the support with a polymerisable substance in fluid form and which is the monomer of the polymerised substance forming the preliminary support, and then subjecting the whole to polymerisation treatment which agglomerates it into a solid mass.

5. The method of forming an electrically insulating bushing or sleeve, which comprises forming a porous preliminary support of a fibrous non-hygroscopic polymerised organic material, incorporating at least one stress-grading conducting foil in the support during the formation thereof, filling the interstices in the support with a monomer other than that of the polymer constituting the support, and polymerising the whole so as to agglomerate it into a solid mass.

6. The method of forming an electrically insulating bushing or sleeve, which comprises forming a porous preliminary support of a fibrous non-hygroscopic polymerised organic material, incorporating at least one stress-grading conducting foil in the support during the formation thereof, filling the interstices in the support with a polymerisable substance in semi-liquid form and constituted by a solution of a polymer in its parent monomer, and subjecting the whole to heat which polymerises the filler within the interstices in the support.

7. The method of forming an electrically insulating bushing or sleeve, which comprises forming a porous preliminary support of fibres of at least two polymers whose electric characteristics differ from each other, incorporating at least one stress-grading conducting foil in the support during formation thereof, filling the interstices in the support with a polymerisable substance in a fluid state, and subjecting the support and filler to heat which polymerises the filler and forms the whole into a solid mass.

8. The method of forming a condenser bushing, which comprises winding polystyrene fibres in a number of superimposed layers about a conductor thus forming a porous preliminary support thereon, arranging at least one perforated conducting foil between adjacent layers during the winding, filling the interstices in the support with monomeric styrene, and subjecting the whole to polymerisation treatment so as to form the insulation into a solid mass with the conducting foil embedded therein.

9. In the method as claimed in claim 2, the additional step of arranging the insulation in a relatively rigid casing or sheath.

10. The method as claimed in claim 5, in which the support comprises polyvinyl acetal and the filler comprises monomeric styrene.

11. The method of forming an electrically insulating bushing or sleeve, which comprises forming a porous preliminary support of a fibrous non-hygroscopic polymerised organic material, incorporating at least one stress-grading conducting foil in the support during the formation thereof, filling the interstices in the support with a solution of a polymer in its parent monomer, the monomer being other than that of the polymer constituting the support, and polymerising the whole so as to agglomerate it into a solid mass.

IAN WARD ANDERSON KIRKWOOD.
PATRICK DUNBAR RITCHIE.